(12) United States Patent
Rothberg et al.

(10) Patent No.: US 6,691,255 B1
(45) Date of Patent: Feb. 10, 2004

(54) ACCELERATED MEDIA SCAN METHOD FOR DETECTION OF DISK DRIVE HANDLING DAMAGE

(75) Inventors: Michael S. Rothberg, Foothill Ranch, CA (US); Jan F. Rebalski, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 516 days.

(21) Appl. No.: 09/585,128

(22) Filed: May 31, 2000

(51) Int. Cl.$^7$ ............................................. G11B 27/36
(52) U.S. Cl. ........................................... 714/42; 714/8
(58) Field of Search ................................ 714/42, 47, 8; 360/53; 369/53.42, 53.17

(56) References Cited

U.S. PATENT DOCUMENTS

| | | | | |
|---|---|---|---|---|
| 5,568,606 A | * | 10/1996 | Dobbek | 714/8 |
| 5,760,993 A | * | 6/1998 | Purkett | 360/78.08 |
| 5,935,261 A | * | 8/1999 | Blachek et al. | 714/42 |
| 6,034,837 A | * | 3/2000 | Purkett | 360/78.04 |
| 6,151,180 A | * | 11/2000 | Bang | 360/53 |
| 6,266,199 B1 | * | 7/2001 | Gillis et al. | 360/31 |

\* cited by examiner

*Primary Examiner*—Scott Baderman
*Assistant Examiner*—Joshua Lohn
(74) *Attorney, Agent, or Firm*—Milad G. Shara, Esq.; Robroy R. Fawcett, Esq.

(57) ABSTRACT

The present invention relates a method for accelerated scanning of a disk drive for media damage caused by rough handling. In the method, a current cylinder number is set to an initial target cylinder number. Data is read from a track associated with the current cylinder number and is checked for an error indicative of media damage. The current cylinder number is then set to a next target cylinder number that is equal to the current cylinder number plus a cylinder skip factor. The skip factor causes the current cylinder number to change by more than one cylinder number. For the new current cylinder number, the reading and checking steps are repeated. Unlike a full media scan that attempts to read all of the tracks of a disk drive, the accelerated media scan method of the invention skips tracks by skipping cylinder numbers to reduce the scan time while maintaining a great deal of certainty that media damage is detected. If media damage is detected, then a full media scan may be performed to determine the scope of the damage. Significant cost savings may be realized due to reductions in testing time provided by the accelerated scan method.

11 Claims, 4 Drawing Sheets

ACCELERATED MEDIA SCAN METHOD FOR DETECTION OF DISK DRIVE HANDLING DAMAGE

BACKGROUND OF THE INVENTION

1. Field of the Invention

The present invention relates to disk drive testing, and more particularly, to scanning a disk drive for media damage caused by rough handling.

2. Description of the Prior Art

Computer manufacturers commonly test computer system components, such as a disk drive, after integration into a computer system to verify that that the components are in proper working order. The amount of time it takes to test a disk drive for media damage caused by rough handling during shipping and assembly of a computer system is roughly proportional to the size of the disk drive's storage capacity. A disk drive with a storage capacity of, for example, ten gigabytes, will require nearly an hour for a full scan of the drive for media damage. With expected increases in disk drive storage capacity, media damage scan times may significantly increase using current scan techniques.

Accordingly, there exists a need for a disk drive scan technique for reducing media damage scan times for disk drives of current storage capacities and for avoiding longer media damage scan times for future disk drives having larger storage capacities.

SUMMARY OF THE INVENTION

The present invention may be embodied in a method for accelerated scanning of a disk drive for media damage caused by rough handling. In the method, a current cylinder number is set to an initial target cylinder number. Data is read from a track associated with the current cylinder number and is checked for an error indicative of media damage. The current cylinder number is then set to a next target cylinder number that is equal to the current cylinder number plus a cylinder skip factor. The skip factor causes the current cylinder number to change by more than one cylinder number. For the new current cylinder number, the reading and checking steps are repeated.

In more detailed features of the invention, the repeating step and the next target cylinder number setting step are continued until an unrecoverable error is detected. Alternatively, the repeating step and the next target cylinder number setting step may be continued until the current cylinder number reaches or passes a predetermined limit such as a maximum cylinder number. The reading step may be performed with zero rotational latency after a seek to the current cylinder number. Also, each error indicative of media damage may be logged by disk location. If the total number of disk errors, or the number of errors within a particular disk region, exceeds a predetermined threshold, the disk drive may be reported as damaged. A full media scan may be performed on the disk drive to determine the extent of the damage.

In other more detailed features of the invention, each cylinder number may be associated with a plurality of tracks and each track of a cylinder number may be further associated with a read/write head number. Also, before the reading step, the method may further include setting a current read/write head number to a first target head number and scanning the tracks associated with the first target head number in accordance with the reading, checking, and repeating steps. Then, the current read/write head number may be set to a next target head number and the tracks associated with the next target head number may be scanned in accordance with the reading, checking, and repeating steps. The first target head number may be associated with a first outside platter surface and the next target head number may be associated with a second outside platter surface. The next target head number may be the current head number plus a head skip factor that is greater than 1.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
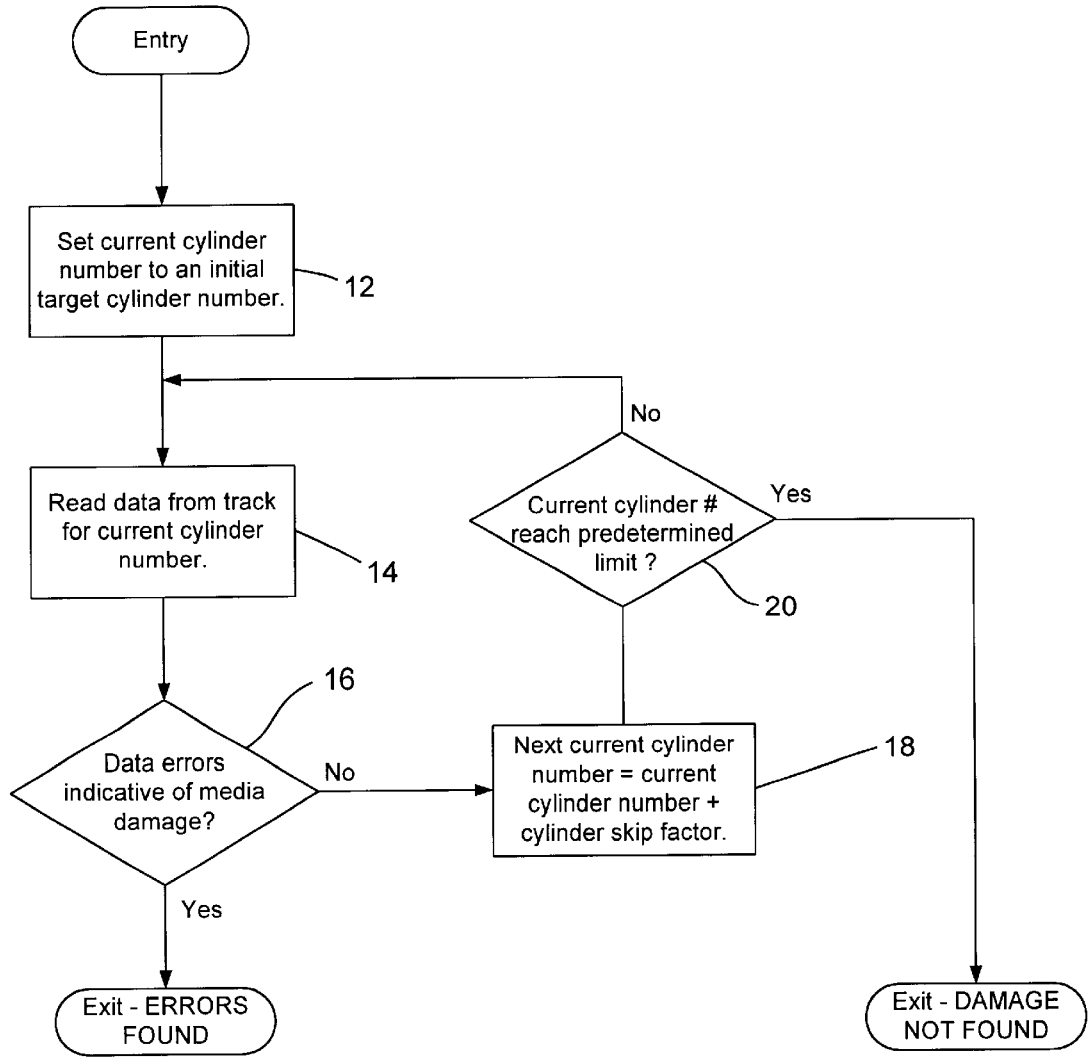
FIG. 1 is a flow chart illustrating an embodiment of a method for scanning a disk drive for media damage, according to the present invention.

With reference to FIG. 1, the invention may be embodied in a method for scanning a disk drive for media damage, comprising setting a current cylinder number to an initial target cylinder number (block 12), reading data stored on a track associated with the current cylinder number (block 14), checking the data read from the track for an error indicative of media damage (block 16), and setting the current target cylinder number to a next target cylinder number that is equal to the current cylinder number plus a cylinder skip factor (block 18). The cylinder skip factor a causes the current cylinder number to change by more than one cylinder number. The reading step (block 14) and the checking step (block 16) are repeated until the current cylinder number reaches a predetermined limit (block 20).

Unlike a full media scan that attempts to read all of the tracks of a disk drive, the accelerated media scan method of the invention skips tracks by skipping cylinder numbers to reduce the scan time while maintaining a great deal of certainty that media damage is detected. If media damage is detected, then a full media scan may be performed to determine the scope of the damage. A computer manufacturer may realize significant cost savings due to reductions in testing time provided by the accelerated scan method.

Figure 2:
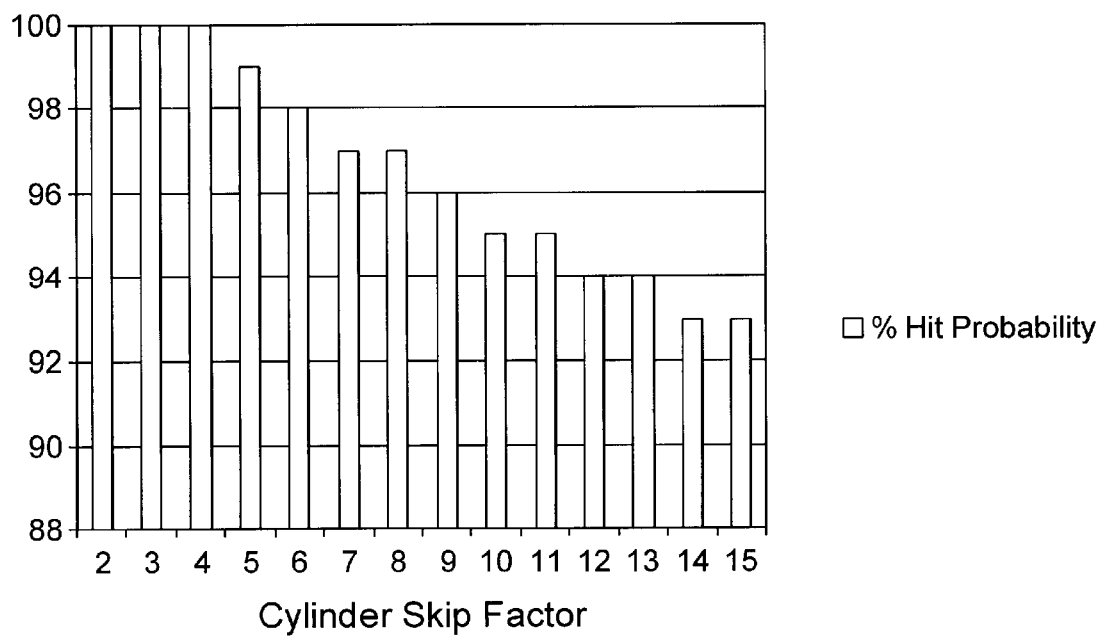
FIG. 2 is a graph illustrating defect hit probability versus cylinder skip factor.

Empirical results using the accelerated media scan method of the invention on disk drives known to have media damage are shown in FIG. 2. A cylinder skip factor of 2 cylinders to 4 cylinders has a hit probability of 100%. Thus, a scan for media damage may be accomplished by reading and checking data on tracks associated with every fourth cylinder number with results equivalent to a full media scan. A skip factor of 15 cylinders has a hit probability of well over 90%. Accordingly, a computer manufacture may reduce media damage scan times by selecting a cylinder skip factor which the manufacturer may deem as acceptable for detecting media damage. For example, a cylinder skip factor of 10 may reduce a media damage scan time from an hour down to about 6 minutes while maintaining a media damage detection probability of about 95%. This may be an acceptable detection probability given that media damage due to rough handling occurs infrequently.

Figure 3:
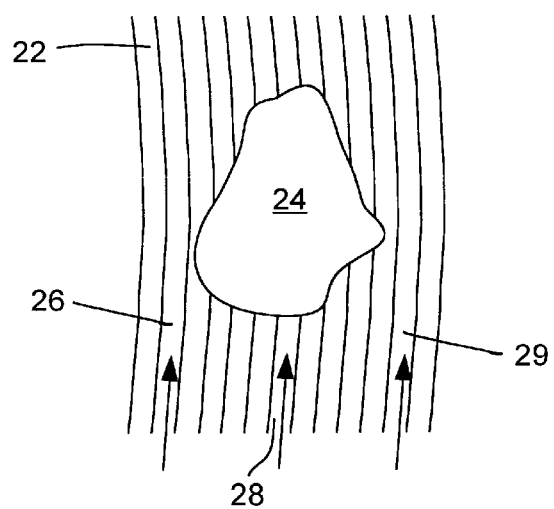
FIG. 3 is a plan view of a portion of a disk surface, showing media damage spanning several data tracks.
Figure 4:
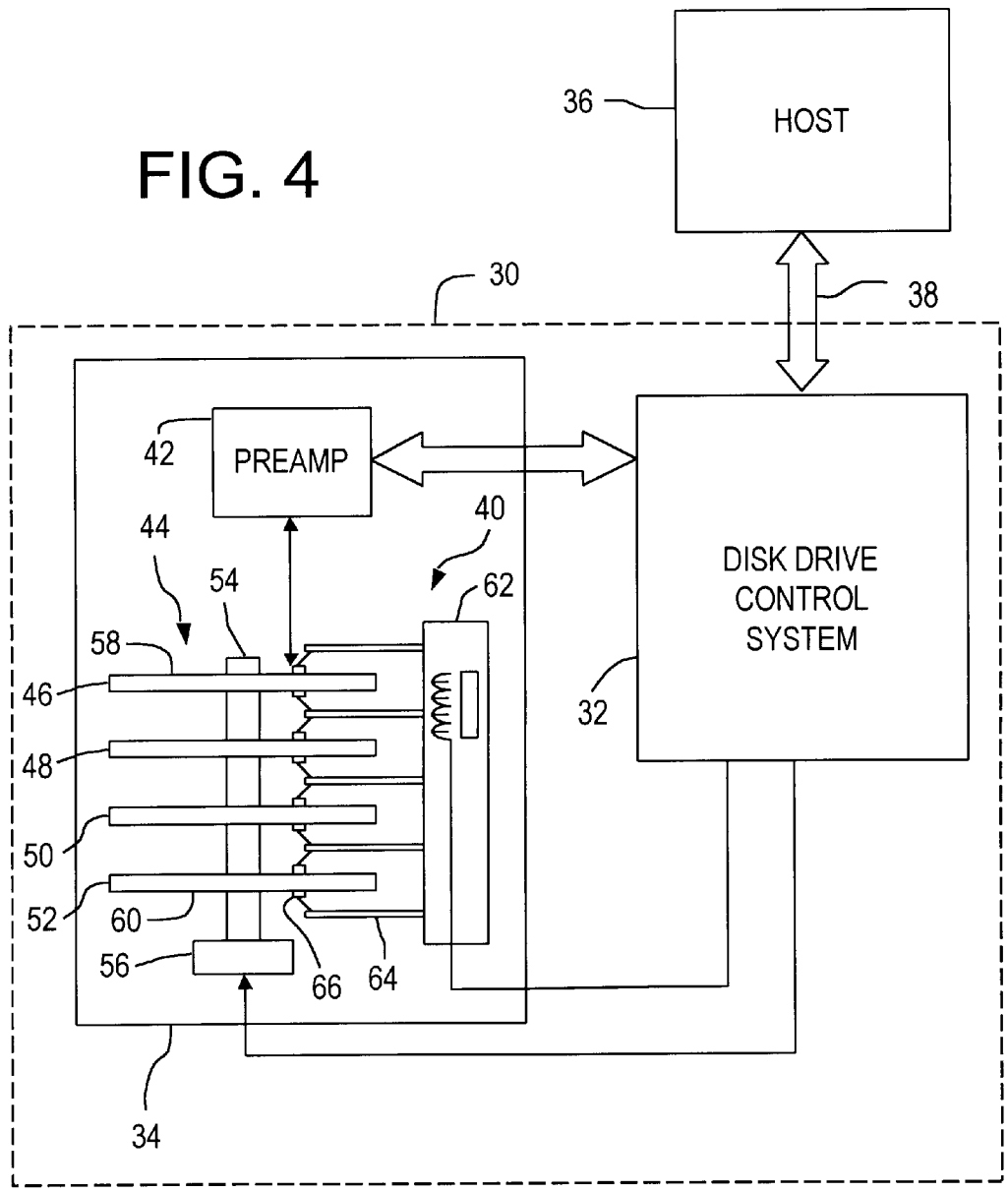
FIG. 4 is a block diagram of a disk drive having a head disk assembly and disk drive control system for controlling the head assembly and for communicating with a host computer, according to the present invention.

With reference to FIGS. 3 and 4, a hard disk drive 30 is illustrated for employing the accelerated scan method of the invention. The disk drive 30 includes a disk drive control system 32 and a head disk assembly (HDA) 34. The control system 32 includes circuitry and processors that control the HDA 34 and that provide an intelligent disk control system interface between a host system 36 and the HDA 34 for execution of read and write commands. Data is transmitted between the host system 36 and the disk control system 32 via a host bus connector 38. Preferably, the accelerated scan method of the invention is implemented by the control system 32 as an internal self test that may be requested by the host or by the drive's internal maintenance system. After the self test, the control system 32 indicates to the host 36 whether damage has been located. Alternatively, the host 36 may implement the method by sending a series of read commands to the disk drive 30 and evaluating the results.

The HDA 34 includes an actuator assembly 40, a preamplifier 42, and a disk assembly 44. The disk assembly 44 includes one or more magnetic media disks, e.g., four magnetic disks 46, 48, 50 and 52. The disks are stacked on a spindle assembly 54. The spindle assembly 54 is mechanically coupled to a spindle motor 56 for rotating the disks at a high rate of speed. The rotational speed of the spindle motor is controlled by the disk drive control system 32. Each disk includes up to two disk-recording surfaces (i.e., disk surfaces) capable of storing data thereon. A discussed in more detail below, the outside surface 58 of the first disk 46 and the outside surface 60 of the fourth disk 52 are the surfaces where rough handling effects are most pronounced.

The actuator assembly 40 includes a voice coil motor (VCM) 62 and multiple actuator arms 64 extending from and permanently coupled to the VCM 62. Transducer or read/write (R/W) heads 66 are disposed at the ends of the actuator arms 64 for communicating with a respective disk surface. The R/W heads 66 communicate with the disk control system 32 via the preamplifier 42 for reading and writing data to the associated disk surface.

In response to control signals from the control system 32, the VCM 62 controllably swings the actuator arms 64 and the corresponding R/W heads 66 back and forth over the associated disk surfaces to access target data tracks 22 (FIG. 3) formed on the associated disk surfaces. The data tracks 22 are closely spaced concentric rings formatted on a layer of magnetic media on the disk surfaces. The individual data tracks 22 are generally referenced by a cylinder number and a head number. For a particular cylinder number, the actuator arms 64 simultaneously position all of the R/W heads 66 over a stack or the data tracks 22, or a "cylinder", on the disk platter surfaces. Generally, the cylinders are consecutively numbered from the outer-most concentric data track to the inner-most concentric data track. The head number corresponds to a particular R/W head 66 and selects a particular data track from a cylinder. The data tracks 22 are generally divided into addressable data segments. The smallest addressable data segment is generally referred to as a sector.

The accelerated scan method is equally effective if the scan starts with the outer-most cylinder, typically cylinder number zero, and incrementally skips to the inner-most cylinder number, or the maximum cylinder number, or if the scan starts with the inner-most cylinder number and incrementally skips to the outer-most cylinder number.

Rough handling of the disk drive 30 may cause the R/W heads 66 to impact the disk surfaces and damage the magnetic media layer on the disk surfaces. The impact of the R/W heads 66 on the disk surfaces is often referred to as "head slap." The entire HDA 34 is involved in an impact so that media damage tends to occur on all of the disk surfaces at about the same location (cylinder number and sector). The media damage is generally most pronounced on the outside surface 58 of the first disk 48 and the outside surface 60 of the bottom disk 52. Accordingly, the accelerated media scan method may be most effective by scanning one or both of these outside surfaces 58 and 60.

The impact of the R/W heads 66 on the disk surface may not entirely damage the magnetic properties of the media layer. Accordingly, the media damage may appear as a region of numerous errors that require a high level of effort to recover the data. An error may be considered an "unrecoverable" error meaning that a high level of effort fails to recover the data. In either case, such errors indicate possible media damage. A full media scan may determine the extent and severity of the damage.

A R/W head 66 is much larger than the width of a data track 22 and the media damage 24 resulting from rough handling is often much larger than the width of a data track 22. The exemplary media damage 24 shown in FIG. 3 has a width of about 9 data tracks 22. A skip factor of 5 cylinders should be effective in locating the media damage 24. More particularly, a first scan 26 is performed along a data track 22 and misses the media damage 24. A next scan 28 on a fifth data track after the data track of the first scan 26 locates the media damage 24. A scan 29 on a subsequent data track misses the media damage 24.

Because the size of the media damage is proportional to the size of the R/W heads 66 and/or the ends of the actuator arms 64 and not to the width of the data tracks 22, the size of the media damage 24 will remain relatively constant even in new higher-data-storage-capacity drives. As track widths decrease, the skip factor may be increased proportionally resulting in a relatively constant scan time without impairing the accelerated media scan method's effectiveness in successfully detecting media damage. Accordingly, media damage scan times should remain relatively constant in spite of higher drive storage capacities achieved by greater track densities.

Figure 5:
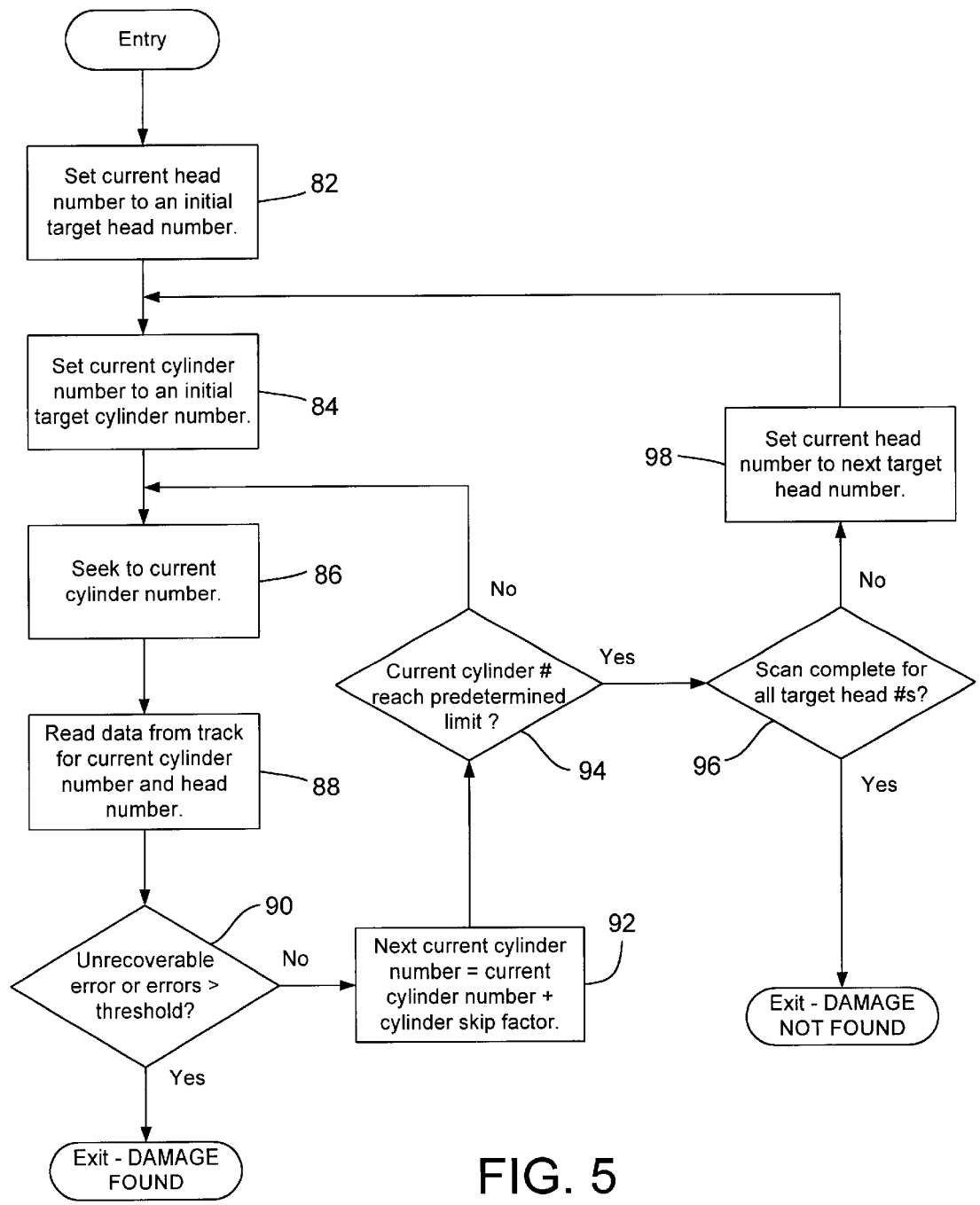
FIG. 5 is a flow chart illustrating another embodiment of a method for scanning a disk drive for media damage, according to the present invention.

An alternative embodiment of a method for accelerated scanning of a disk drive for media damage, according to the invention, is shown in FIG. 5. In the method, a current head number is set to an initial target head number (block 82) and a current cylinder number is set to an initial target cylinder number (block 84). A seek to the current cylinder number is performed (block 86). Data is read from a track associated with the current cylinder number and the current head number (block 88). The data read from the track is checked for an error (block 90). If an unrecoverable error is located, then the scan may be terminated. If a recoverable error is located, the location of the error may be logged for more thorough testing in accordance with conventional scan techniques if a threshold number of errors indicative of media damage is logged, and the accelerated scan continued. The current cylinder number is set to a next target cylinder number that is equal to the current cylinder number plus a cylinder skip factor (block 92). The scan is completed for the current head number, e.g., until the next cylinder number reaches or passes a predetermined limit (block 94). The predetermined limit may be a maximum cylinder number, etc.

The next target head is selected and the scan is continued (block 98) until scans for all of the target heads numbers have been completed (block 96). The target heads may include the head associated with the outside surface 58 (FIG. 4) of the first disk 46 and the head associated with the outside surface 60 of the last or bottom disk 58.

A seek to the current cylinder number may result in the R/W head 66 arriving at the target data track 22 before the disk has rotated to a particular sector. The idle time for the disk to rotate may be eliminated or reduced by using a zero-latency read technique. The zero-latency read technique takes advantage of the fact that the sectors do not need to be read in any particular sequential order. In this technique, after the R/W head 66 settles over the target data track 22, the first available sector may be read and checked for errors. The process may continue until all of the sectors on the target data track have been read and checked.

Also, the skip factor may not be constant during an accelerated media scan. For example, the skip factor may be adjusted to optimize for track-to-track seek time. A nominal skip factor may result in a target track seek missing the beginning of a track whereas a skip factor of one or two cylinders more or less than the nominal skip factor may permit an efficient seek from the end of a current track to a start of a next target track without significant rotational latency.

We claim:

1. A method for scanning a disk drive for media damage, comprising:

setting a current cylinder number to an initial target cylinder number;

reading data stored on a track associated with the current cylinder number;

checking the data read from the track for an error indicative of media damage;

setting the current cylinder number to a next target cylinder number that is equal to the current cylinder number plus a cylinder skip factor, wherein the cylinder skip factor causes the current cylinder number to change by more than one cylinder number;

repeating the reading and checking steps; and continuing the repeating step and the next target cylinder number setting step until an unrecoverable error is detected.

2. A method for scanning a disk drive for media damage, comprising:

setting a current cylinder number to an initial target cylinder number;

reading data stored on a track associated with the current cylinder number;

checking the data read from the track for an error indicative of media damage;

setting the current cylinder number to a next target cylinder number that is equal to the current cylinder number plus a cylinder skip factor, wherein the cylinder skip factor causes the current cylinder number to change by more than one cylinder number; and repeating the reading and checking steps;

wherein each cylinder number is associated with a plurality of tracks and each track of a cylinder number is further associated with a read/write head number, and wherein before the reading step, the method further comprises setting a current read/write head number to a first target head number and scanning the tracks associated with the first target head number in accordance with the reading, checking, and repeating steps, and then setting the current read/write head number to a next target head number and scanning the tracks associated with the next target head number in accordance with the reading, checking, and repeating steps.

3. A method for scanning a disk drive for media damage as defined in claim 2, wherein the first target head number is associated with a first outside platter surface.

4. A method for scanning a disk drive for media damage as defined in claim 3, wherein the next target head number is associated with a second outside platter surface.

5. A method for scanning a disk drive for media damage as defined in claim 2, wherein the next target head number Is the current head number plus a head skip factor that is greater than 1.

6. A method for scanning a disk drive for media damage, comprising:

setting a current cylinder number to an initial target cylinder number;

reading data stored on a track associated with the current cylinder number;

checking the data read from the track for an error indicative of media damage;

setting the current cylinder number to a next target cylinder number that is equal to the current cylinder number plus a cylinder skip factor, wherein the cylinder skip factor causes the current cylinder number to change by more than one cylinder number;

repeating the reading and checking steps; and logging each error indicative of media damage and reporting the disk drive as damaged if the number of errors exceeds a predetermined threshold number.

7. A method for scanning a disk drive for media damage, comprising:

setting a current cylinder number to an initial target cylinder number;

reading data stored on a track associated with the current cylinder number;

checking the data read from the track for an error indicative of media damage;

setting the current cylinder number to a next target cylinder number that is equal to the current cylinder number plus a cylinder skip factor, wherein the cylinder skip factor causes the current cylinder number to change by more than one cylinder number;

repeating the reading and checking steps; and logging each error indicative of media damage by disk location and reporting the disk drive as damaged if the number of errors within a particular disk region exceeds a predetermined threshold number.

8. A method for scanning a disk drive for media damage, comprising:

setting a current cylinder number to an initial target cylinder number;

reading data stored on a track associated with the current cylinder number, wherein the reading step is performed with zero rotational latency after a seek to the current cylinder number;

checking the data read from the track for an error indicative of media damage;

setting the current cylinder number to a next target cylinder number that is equal to the current cylinder number plus a cylinder skip factor, wherein the cylinder skip factor causes the current cylinder number to change by more than one cylinder number; and repeating the reading and checking steps.

9. A method for scanning a disk drive for media damage comprising:

setting a current cylinder number to an initial target cylinder number;

reading data stored on a track associated with the current cylinder number;

checking the data read from the track for an error indicative of media damage;

setting the current cylinder number to a next target cylinder number that is equal to the current cylinder number plus a cylinder skip factor, wherein the cylinder skip factor causes the current cylinder number to change by at least 4 cylinder numbers; and repeating the reading and checking steps.

10. A method for scanning a disk drive for media damage comprising:

setting a current cylinder number to an initial target cylinder number;

reading data stored on a track associated with the current cylinder number;

checking the data read from the track for an error indicative of media damage;

setting the current cylinder number to a next target cylinder number that is equal to the current cylinder number plus a cylinder skip factor, wherein the cylinder skip factor causes the current cylinder number to change by at least 10 cylinder numbers; and repeating the reading and checking steps.

11. A method for scanning a disk drive for media damage comprising:

setting a current cylinder number to an initial target cylinder number;

reading data stored on a track associated with the current cylinder number;

checking the data read from the track for an error indicative of media damage;

setting the current cylinder number to a next target cylinder number that is equal to the current cylinder number plus a cylinder skip factor, wherein the cylinder skin factor causes the current cylinder number to change by more than one cylinder number, and the cylinder skip factor is based on a size of a read/write head and on a track density; and repeating the reading and checking steps.

* * * * *